US008824995B2

(12) United States Patent
Sennett et al.

(10) Patent No.: US 8,824,995 B2
(45) Date of Patent: Sep. 2, 2014

(54) SYSTEMS AND METHODS FOR USING A NETWORK IDENTIFIER TO DETERMINE EMERGENCY ALERT INFORMATION

(75) Inventors: DeWayne Allan Sennett, Redmond, WA (US); Brian Kevin Daly, Seattle, WA (US)

(73) Assignee: AT&T Mobility II LLC, Atlanta, GA (US)

(*) Notice: Subject to any disclaimer, the term of this patent is extended or adjusted under 35 U.S.C. 154(b) by 1316 days.

(21) Appl. No.: 12/264,693

(22) Filed: Nov. 4, 2008

(65) Prior Publication Data
US 2010/0112975 A1    May 6, 2010

(51) Int. Cl.
*H04M 11/04*    (2006.01)
*H04W 76/00*    (2009.01)
*H04W 4/22*    (2009.01)

(52) U.S. Cl.
CPC .............. *H04W 4/22* (2013.01); *H04W 76/007* (2013.01)
USPC ................. 455/404.1; 455/412.2; 455/414.1; 455/414.4; 455/435.1; 455/567

(58) Field of Classification Search
USPC ............ 455/404.1, 404.2, 412.1, 435.1, 567, 455/414.1–414.4
See application file for complete search history.

(56) References Cited

U.S. PATENT DOCUMENTS

| 6,112,075 | A | 8/2000 | Weiser .......................... 455/404 |
| 7,233,795 | B1* | 6/2007 | Ryden ........................... 455/445 |
| 2004/0203562 | A1* | 10/2004 | Kolsrud ...................... 455/404.1 |
| 2006/0040639 | A1 | 2/2006 | Karl et al. ................... 455/404.1 |
| 2007/0298758 | A1* | 12/2007 | Verma et al. ............... 455/404.1 |
| 2008/0057955 | A1* | 3/2008 | Choi-Grogan ............. 455/435.1 |
| 2009/0227224 | A1* | 9/2009 | Aftelak et al. ............. 455/404.2 |
| 2009/0291630 | A1* | 11/2009 | Dunn et al. .................. 455/3.01 |
| 2010/0062747 | A1* | 3/2010 | Harris et al. ............... 455/412.1 |

* cited by examiner

*Primary Examiner* — Michael T Vu
(74) *Attorney, Agent, or Firm* — Baker & Hostetler LLP

(57) ABSTRACT

A mobile device may be activated and/or updated to receive alert messages from a network. For example, the mobile device may initiate a registration request with a network. Upon initiating the registration request, the mobile device may receive a network identifier from the network. The mobile device may then access information associated with alert messages for a location of the network based on the network identifier such that the mobile device may be activated to receive an alert message from the network based on the accessed information.

16 Claims, 5 Drawing Sheets

SYSTEMS AND METHODS FOR USING A NETWORK IDENTIFIER TO DETERMINE EMERGENCY ALERT INFORMATION

BACKGROUND

Emergency Alert Systems (EAS) typically provide messages indicative of a variety of types of alerts including, for example, weather conditions, disasters, AMBER (America's Missing: Broadcast Emergency Response) alerts, and/or alerts issued by the Government, for example. Currently, regulations associated with such EAS alert messages may vary among locations such as from country to country, region to region, or the like. Unfortunately, because such regulations may vary among locations, a mobile device may have difficulty determining the emergency alert channels and associated rules (e.g., can emergency alerts be turned off) when a subscriber of the mobile device may be in different countries, different regions, or the like.

SUMMARY

Network identifiers and/or alert information may be used to update and/or activate a mobile device to receive an alert message from a network. For example, a registration request may be initiated by a mobile device such as a telephone, a cellular telephone, a Personal Data Assistant (PDA), or the like with a network. According to an example embodiment, the network may be a network not associated with a network provider of the mobile device. In one embodiment, upon initiating the registration request, a network identifier may be received by the mobile device from the network. The mobile device may access information associated with alert messages for a location of the network based on the network identifier. According to an example embodiment, the mobile device may then be activated to receive an alert message from the network based on the accessed information.

DETAILED DESCRIPTION OF ILLUSTRATIVE EMBODIMENTS

Figure 1:
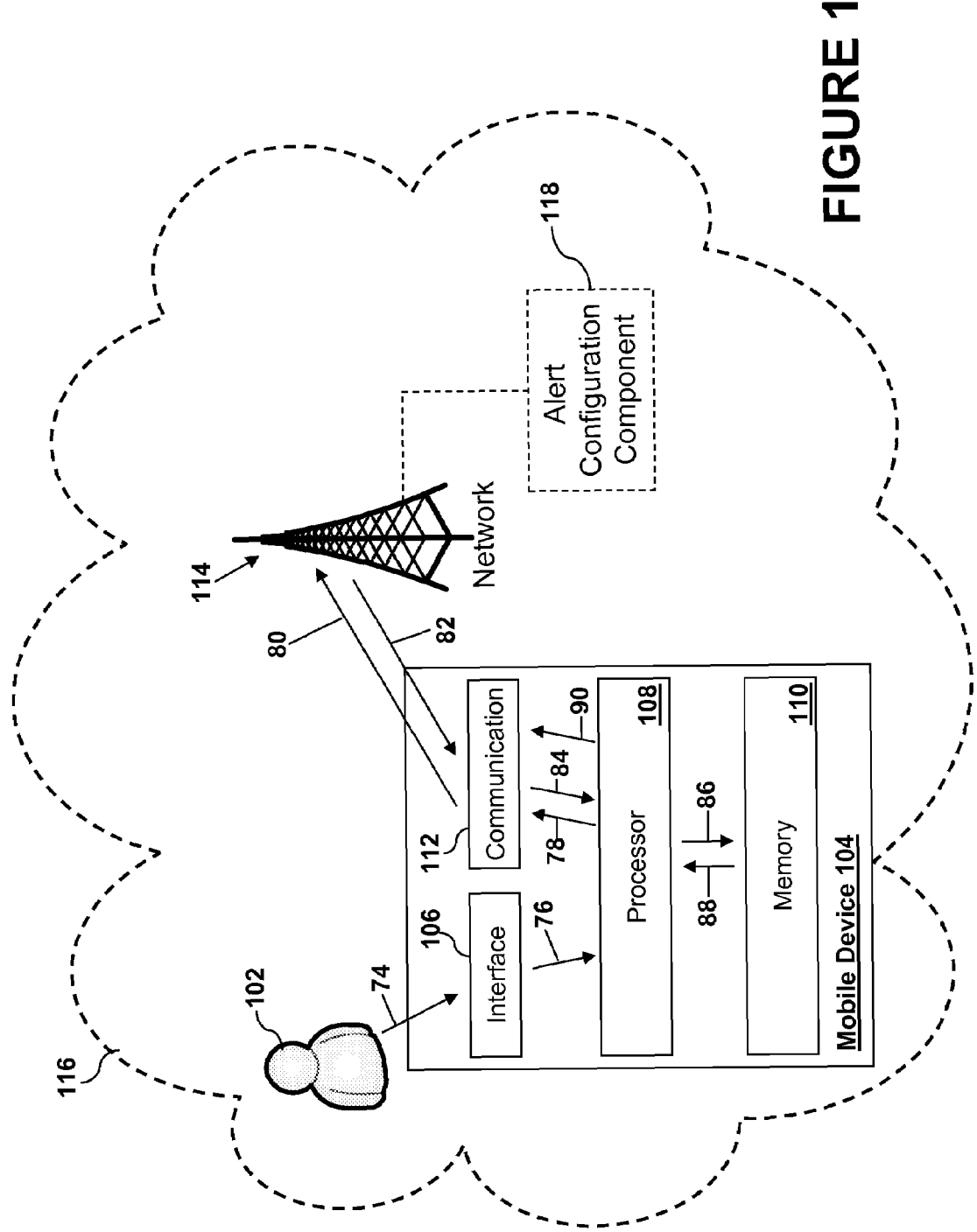
FIG. 1 depicts example systems and example processes for activating and/or updating a mobile device to receive an alert message from a network.

As will be described herein, Emergency Alert System (EAS) alert messages may be broadcast to a mobile device such as a cellular telephone, a Personal Data Assistant (PDA), or the like. In an example embodiment, the mobile device may monitor control channels for alert messages for a location based on alert information such as instructions regarding rules, regulations, channels, or the like of the location. For example, when the mobile device may detect that it may be in a location serviced by, for example, a network associated with a different network provider, the mobile device may initiate a registration sequence or registration request with the network. If an agreements exist between the network and a network provider of the mobile device, the mobile device may be allowed access to the network. According to one embodiment, during the registration sequence or registration request, an identifier associated with the network such as a PLMN in a GSM network may be provided to the mobile device. The mobile device may then access alert information based on the identifier to activate the mobile device to receive an alert message from the network. Additionally, during the registration sequence or the registration request, alert information may be provided to the mobile device from the network that may be used to activate the mobile device to receive an alert message from the network. The alert information may include, for example, channels to monitor for alert messages, an identification of which channels or alerts may be disabled by the subscribers, an identification of which channels or alert messages have to be delivered (e.g., Presidential alerts), an indication of whether multiple languages are supported and how such languages are supported (e.g., separate channels, interleaved on a channel). such that the mobile device can access alert information to activate the mobile device to receive an alert message from the network FIG. 1 depicts example systems and example processes for activating a mobile device to receive an alert message from a network. As shown in FIG. 1, a mobile device 104 may be in communication with a network 114. The network 114 may be any type of communication network such as the internet, a Local Area Network (LAN), a Wide Area Network (WAN), a cellular telephone network, or the like. For example, the network 114 may include the example networks described below in FIGS. 3-5 such as Global System for Mobile communication ("GSM"), General Packet Radio Service ("GPRS"), Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), WiFi, WiMAX, or the like.

The network 114 may be operated by a network provider such as an internet service provider, a cellular telephone provider, or the like. According to an example embodiment, the network provider may offer bandwidth and/or network access to subscribers thereof to enable communication between the subscribers and other devices such as cellular phones, PDAs, PCs, Voice over Internet Protocol devices, analog telephone devices, or the like. In one embodiment, the bandwidth and/or network access provided by the network provider may be limited to a location 116 such as, for example, a country, a state, a city, a town, a county, or any other region defined by the network provider in which the network 114 may operate.

The mobile device 104 may be representative of any appropriate type of device that may be utilized, for example, to receive an alert message such as an EAS alert message. According to example embodiments, the mobile device 104 may be any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

The mobile device 104 may include hardware components such as a processor, a graphics card, a storage component, a memory component, an antenna, a communication component, an interface component such as a speaker, a display, a keypad, a microphone, or the like. The mobile device 104 may also include software components such as an operating system that may control the hardware components.

In one embodiment, the mobile device 104 may include an interface component 106, a processor 108, a memory component 110, and a communication component 112. The interface component 106 may include, for example, an input component such as a keypad, a touch screen, a button, a microphone, or the like, and an output component such as a speaker, a display, or the like.

According to one embodiment, at 74, a subscriber 102 may interact with the mobile device 104 to, for example, initiate a registration request with the network 114. For example, as described above, the interface component 106 may include an input component such as a keypad, a touch screen, a button, a microphone, or the like. At 74, the subscriber 102 may interact with the input component of the interface component 106 to power on the mobile device 104, register and/or re-register the mobile device 104 with the network 114, or the like. For example, the input component may include a power button in one embodiment. Upon pressing the power button, the mobile device 104 may be turned on and a registration request may be initiated with the network 114 as described below. Additionally, the subscriber 102 may also interact with an option provided by the interface component 106 to, for example, manually initiate a registration request.

In another embodiment, the mobile device 104 may initiate the registration request automatically. For example, the subscriber 102 may travel between various locations such as countries, states, regions, or the like. Each location may be serviced by different networks and/or network providers such that the mobile device 104 may automatically register with a network such as the network 114 when the mobile device 104 establishes a communication session with the network, which will be described in more detail below.

The interface component 106 may provide the registration request initiated by the mobile device 104 and/or associated with an interaction to, for example, power on the mobile device 104, register and/or re-register the mobile device 104 with the network 114, or the like to the processor 108 at 76. The processor 108 may include any appropriate type of processor such as a single processor, multiple processors that may be distributed or centrally located, or the like. For example, the processor 108 may be a mobile communications device processor, a computer processor, a handheld processor, or the like. The processor 108 may include any other suitable hardware such as cache, Random Access Memory, storage devices, or the like and/or software. According to an example embodiment, the processor 108 may activate a channel associated with the location 116 serviced by the network 114 to receive alert messages, load information for alert messages such as rules and/or regulations associated with the location 116 serviced by the network 114, or the like, which will be described in more detail below.

In one embodiment, the interface component 106 may provide the interaction to a power supply (not shown) prior to providing the interaction to the processor 108, at 76, such that the power supply (not shown) may turn on the mobile device 104 including the processor 108.

At 78, the processor 108 may provide the registration request to the communication component 112 of the mobile device 104. The communication component 112 may include an antenna, communication port, or the like that may be used to establish a communication link with the network 114. The communication component 112 may then provide the registration request to the network 114, at 80, using the communication link established between the communication component 112 and the network 114.

In one embodiment, the network 114 may provide a network identifier to the mobile device 104 at 82. For example, the network 114 may provide a network identifier to the communication component 112 using the communication link established between the communication component 112 and the network 114. The network identifier may include, for example, an operator identification number or any other suitable alphanumeric representation that may be used to identify the network 114 and/or the network provider operating the network 114.

Additionally, the network 114 may provide alert information associated with, for example, rules, regulations, settings such as channels for an alert messages in to the mobile device 104 at 82. For example, the network 114 may include an alert configuration component 118. The alert configuration system 118 may include any combination of hardware components such as processors, databases, storage drives, registers, cache, RAM memory chips, data buses, or the like and/or software components such as operating systems, database management applications, or the like. According to an example embodiment, the alert configuration system 118 may be a network-based server that may provide alert information to a mobile device such as the mobile device 104.

In an example embodiment, the network 114 may determine whether the mobile device 104 has permission to access the network 114 based on the registration request before the network 114 may provide the network identifier and/or the alert information the mobile device 104 at 82. For example, the network 114 may be a guest network or network that may not typically service the mobile device 104. The registration request may include a device identifier such as a International Mobile Equipment Identity (IMEI) identifier, a Subscriber Identity Module (SIM) identifier stored on, for example, a SIM card, or the like of the mobile device 104, and/or a device network identifier for the network provider or home network of the mobile device 104. The network 114 may then use the device identifier and/or the device network provider identifier of the mobile device 104 to determine, for example, whether an agreement exists between the network provider or home network of the mobile device 104 and the network 114.

In one embodiment, the alert configuration system 118 may receive the registration request from the mobile device 104 and may determine whether the mobile device 104 may have permission to access the network 114. For example, the device identifier may be provided to the alert configuration system 118 such that the alert configuration system 118 may determine, for example, whether an agreement exists between the network provider or home network of the mobile device 104 and the network 114.

According to additional embodiments, other suitable components of the network 114 may be used to receive the registration request from the mobile device 104 and determine whether the mobile device 104 may have permission to access the network 114. For example, the network 114 may include a Home Location Register (HLR), a Mobile Switching Center (MSC), or the like, which will be described in more detail below, that may be used to receive the registration request from the mobile device 104 and determine whether to provide a network identifier and/or alert information to the mobile device 104 based on the registration request.

At 84, the communication component 112 may provide the network identifier and/or the alert information provided by the network 114, at 82, to the processor 108. The processor 108 may then analyze the network identifier and/or the alert message information to, for example, activate the mobile device 104 to receive an alert message from the network 114.

For example, if a network identifier may be provided by the network 114 to the mobile device 104, the processor 108 may compare the network identifier provided by the communication component 112, at 84, with a profile, a table, or the like associated with alert information stored in, for example, the memory component 110 at 86. The memory component 110 may include a flash memory, cache, RAM memory chips, ROM memory chips, or the like. Thus, according to an example embodiment, the processor 108 may access alert information stored in the memory component 110 to, for example, activate the mobile device 104 to receive an alert message from the network 114.

If the network identifier corresponds to a stored network identifier in, for example, the profile, table, or the like associated with alert message information stored in the memory component 110, the alert information associated with the network identifier may be provided from the memory component 110 to the processor 108 at 88. The processor 108 may then load the alert information such that the mobile device 104 may be activated to receive an alert message from the network 114.

Additionally, in one embodiment, if alert information may be provided by the network 114 to the mobile device, the processor 108 may provide the information to the memory component 110 at 86. The memory component 110 may then store the alert message information associated with, for example, the location 116 of the network 114 such that the mobile device 104 may dynamically create the profile, table, or the like based on the locations and networks in which the mobile device 104 may have been registered.

The processor 108 may then activate the communication component with the alert information, at 90, such that the mobile device 104 may be configured to receive an alert message that may be provided by the network 114 according to, for example, rules, regulations, or the like associated with alert messages in the location 116 of the network 114, which will be described in more detail below.

Figure 2:
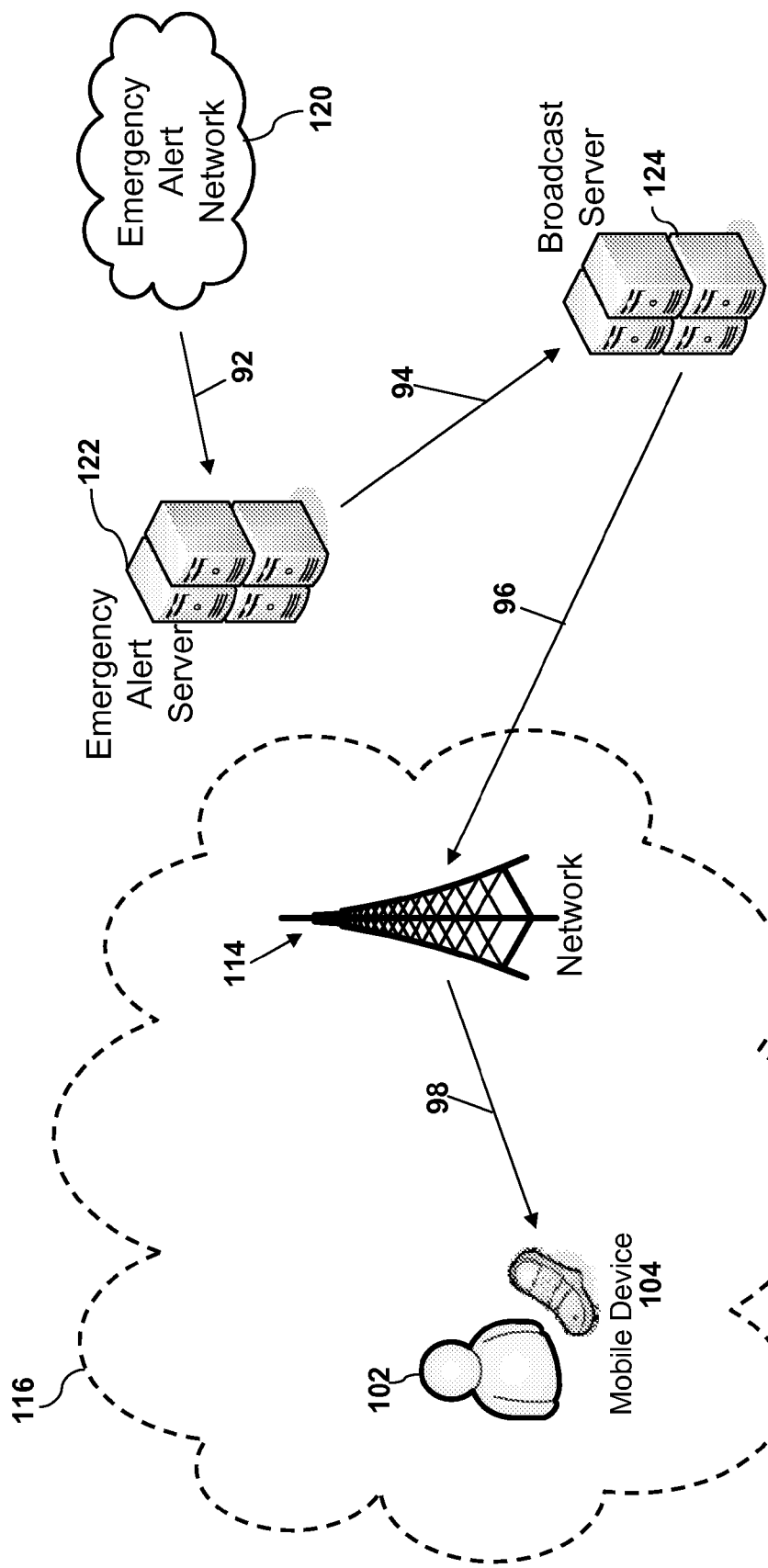
FIG. 2 depicts an example system and an example process for providing an alert message to a mobile device.

FIG. 2 depicts an example system and an example process for providing an alert message to a mobile device. For example, an alert message such as an EAS alert message may be generated and provided, at 92, via an emergency alert network 120, to an emergency alert server 122. The alert message may include general alert types such as general weather alerts, general natural disaster alerts, general government alerts, or the like and/or a specific alert types such as child abduction (e.g., AMBER—America's Missing: Broadcast Emergency Response), geophysical e.g., landslide, meteorological (e.g., windstorm, tornado, hurricane, tsunami, lightning storms, thunderstorms, hurricanes, freezing rain, blizzards, fog), general emergency and public safety, law enforcement, military, homeland and local/private security, rescue and recovery, fire suppression and rescue, medical and public health, pollution and other environmental conditions, public and private transportation, utility, telecommunication, other non-transport infrastructure, CBRNE (Chemical, Biological, Radiological, Nuclear or Explosive) threat or attack, and/or system test, or the like. The alert message may also include alert severity levels such as warnings, watches, advisories, or the like that may be associated with each alert type, for example. At 94, the alert message may be provided by the emergency alert server 122 to a broadcast server 124.

At 96, the broadcast server 124 may then provide the alert message to the network 114. As described above, the network 114 may include may be any type of communication network such as the internet, a Local Area Network (LAN), a Wide Area Network (WAN), a cellular telephone network, or the like. For example, the network 114 may include the example networks described below in FIGS. 3-5 such as GSM, UMTS, CDMA, WiFi, WiMax, EDGE, or the like.

According to one embodiment, the network 114 may provide the EAS alert message to the mobile device 104 at 98. For example, if the network 144 establishes a communication session with the mobile device 104, the network provider may broadcast the alert message to the mobile device 104 at 98. In one embodiment, the mobile device 104 may receive the alert message based on the network identifier and/or the alert message information provided by the network 114, at 82, as described above. For example, at 98, the mobile device 104 may receive alert messages based on rules, regulations, channels, or the like provided in the alert information.

According to an example embodiment, the mobile device 104 may render the alert message to the subscriber 102 upon receipt of the message at 98. For example, the interface component 106, described above with respect to FIG. 1, may render an indication that may be provided to the output component such as a visual indication that may be output, for example, via a display, an audio indication that may be output, for example, via a speaker, or the like.

The following description sets forth some exemplary telephony radio networks and non-limiting operating environments for broadcasting secure messages. The below-described operating environments should be considered non-exhaustive, however, and thus the below-described network architectures merely show how EAS alert messages may be incorporated into existing network structures and architectures. It may be appreciated, however, that EAS alert messages may be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art may appreciate, the exemplary GSM/GPRS environment and services described herein also may be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS alert messages may be applied independently of the method for data transport, and do not depend on any particular network architecture, or underlying protocols.

Figure 3:
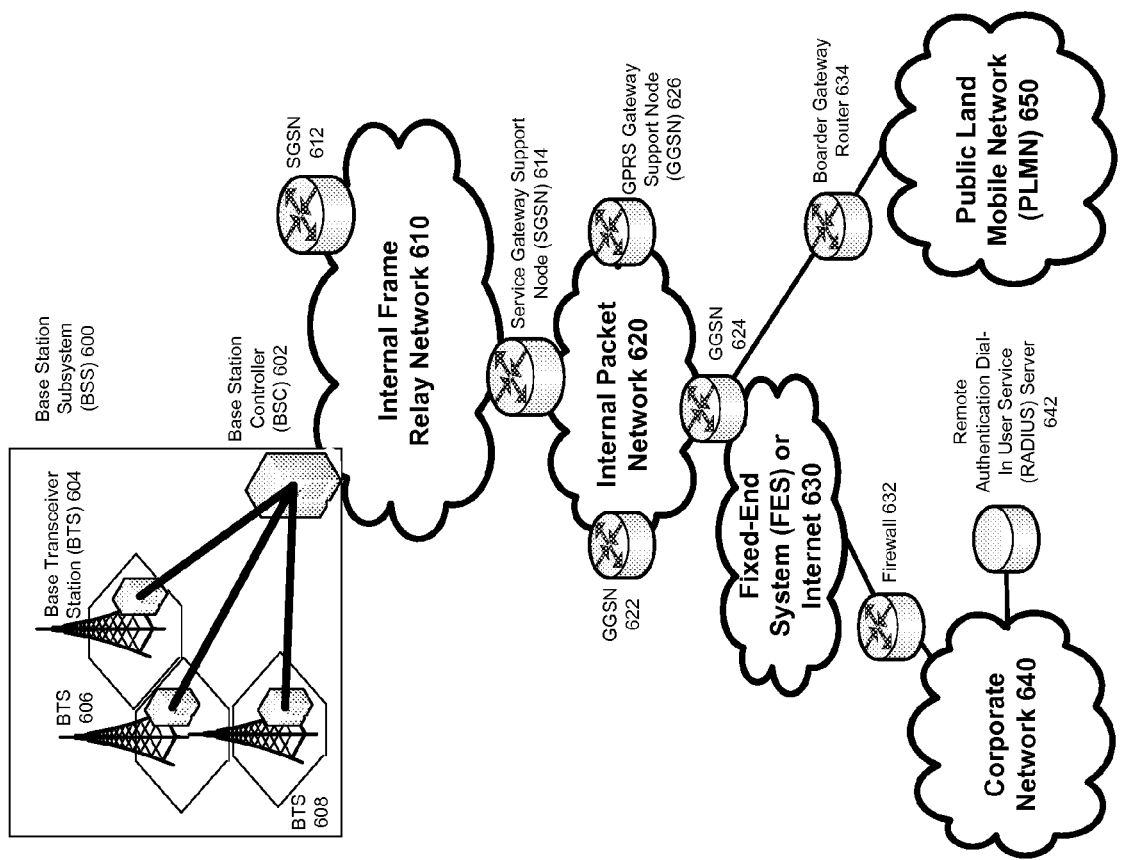
FIG. 3 depicts an overall block diagram of an exemplary packet-based mobile cellular network environment, such as a GPRS network, that may be used to provide an alert message.

FIG. 3 depicts an overall block diagram of an exemplary packet-based mobile cellular network environment, such as a GPRS network, that may be used to activate a security system upon receipt of an alert message. In an example configuration, the emergency alert network 120 and/or the network 114 may be encompassed by the network environment depicted in FIG. 3. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., portable device 38) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that may include Service GPRS Support Nodes ("SGSN") such as SGSN 612 and 614. Each SGSN is connected to an internal packet network 620 through which a SGSN 612, 614, etc. may route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 4:
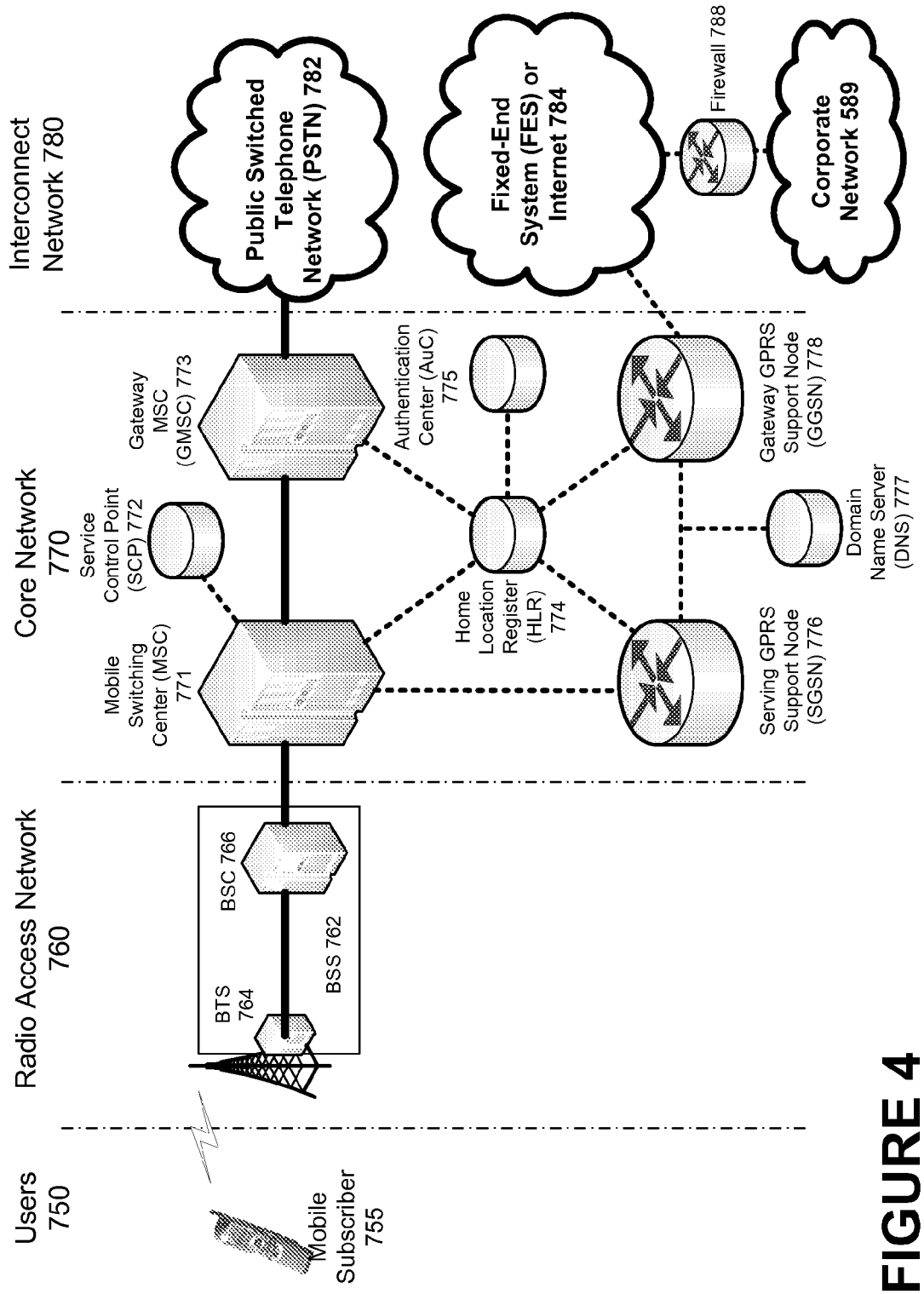
FIG. 4 illustrates an architecture of a typical GPRS network as segmented into four groups.

FIG. 4 illustrates an architecture of a typical GPRS network as segmented into four groups: users 750, radio access network 760, core network 770, and interconnect network 780. In an example configuration the emergency alert network 120, and the network 114 are encompassed by the radio access network 760, core network 770, and interconnect network 780. Users 750 comprise a plurality of end users (though only mobile subscriber 755 is shown in FIG. 4). In an example embodiment, the device depicted as mobile subscriber 755 comprises portable device 38. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 4, interconnect network 780 comprises Public Switched Telephone Network ("PSTN") 782, Fixed-End System ("FES") or Internet 784, firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 104, used by an end user of the mobile cellular service. When a mobile subscriber turns on his or her mobile device, the mobile device goes through an attach process by which the mobile device attaches to an SGSN of the GPRS network. In FIG. 4, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which may be corporate network 789 in FIG. 4) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 may access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 may then go through radio access network 760, core network 770, and interconnect network 780, in a particular fixed-end system or Internet 784 and firewall 788, to reach corporate network 789.

Thus, network elements that may invoke the functionality of a configuration based EAS alert message may include but are not limited to Gateway GPRS Support Node tables, Fixed End System router tables, firewall systems, VPN tunnels, and any number of other network elements as required by the particular digital network.

Figure 5:
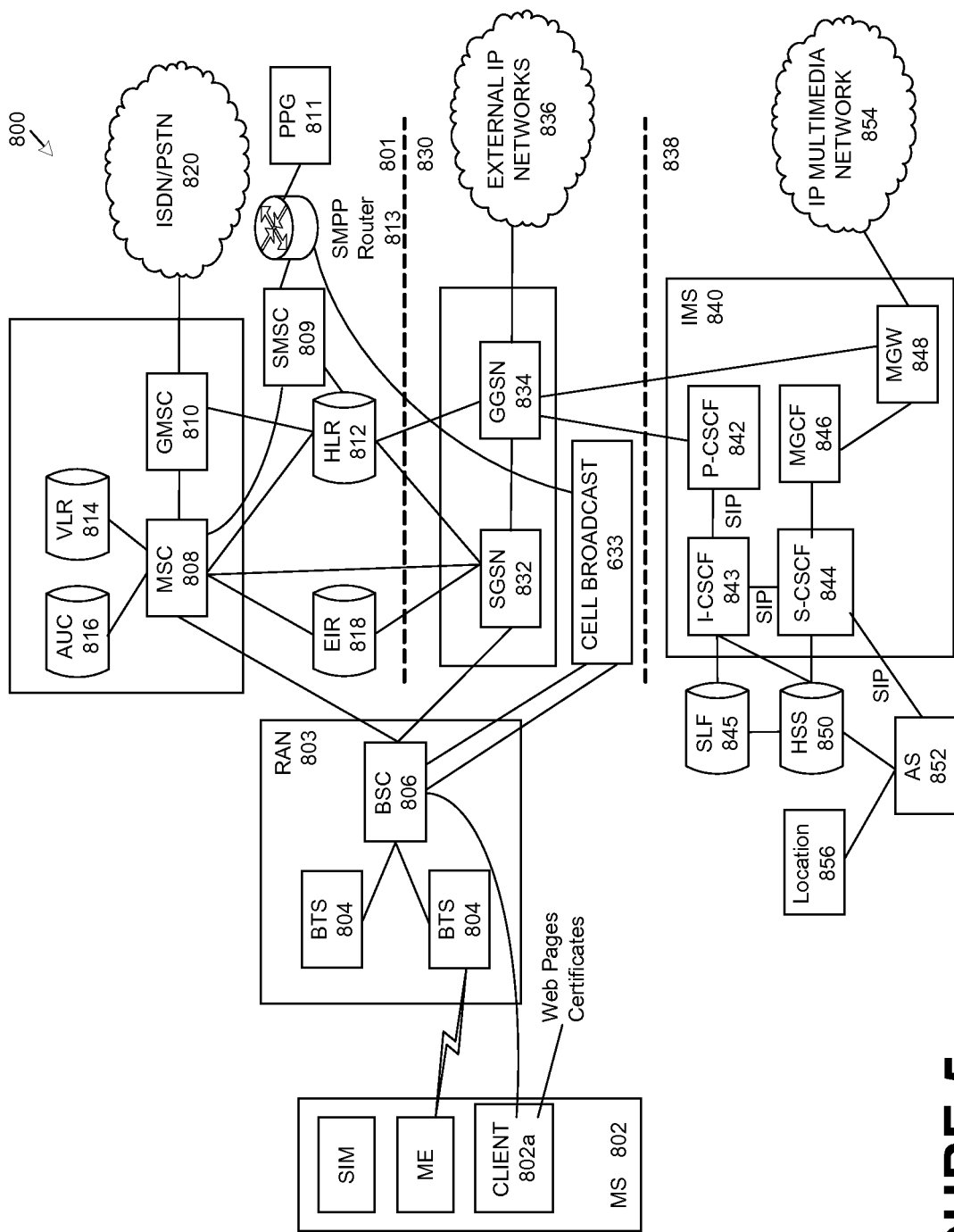
FIG. 5 illustrates an example alternate block diagram of an exemplary GSM/GPRS/IP multimedia network architecture that may be used to provide an alert message.

FIG. 5 illustrates another exemplary block diagram view of a GSM/GPRS/IP multimedia network architecture 800 that may be used to activate a security system upon receipt of an alert message. As illustrated, architecture 800 of FIG. 5 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., portable device 38) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS also supports simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS may only use one of the two services at a given time.

A class C MS may attach for only one of the GPRS services and GSM services at a time. Simultaneous attachment and operation of GPRS services and GSM services is not possible with a class C MS.

A GPRS network 830 may be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS may monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of activating and/or updating a mobile device to receive an alert message have been described in connection with various computing devices, the underlying concepts may be applied to any computing device or system capable of activating and/or updating a mobile device to receive an alert message. The various techniques described herein may be implemented in connection with hardware or software or, where appropriate, with a combination of both. Thus, the methods and apparatus of of activating and/or updating a mobile device to receive an alert message, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer. In the case of program code execution on programmable computers, the computing device may include a processor, a storage medium readable by the processor (including volatile and non-volatile memory and/or storage elements), at least one input device, and at least one output device. The program(s) may be implemented in assembly or machine language, if desired. In any case, the language may be a compiled or interpreted language, and combined with hardware implementations.

The methods and apparatus for activating and/or updating a mobile device to receive an alert message also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, such that the machine may become an apparatus for activating and/or updating a mobile device to receive an alert message. When implemented on a general-purpose processor, the program code may combine with the processor to provide a unique apparatus that may operate to invoke the functionality of activating and/or updating a mobile device to receive an alert message. Additionally, any storage techniques used in connection with activating and/or updating a mobile device to receive an alert message may invariably be a combination of hardware and software.

While activating and/or updating a mobile device to receive an alert message has been described in connection with the various embodiments of the various figures, it is to be understood that other similar embodiments may be used or modifications and additions may be made to the described embodiment for performing the same functions described herein. For example, one skilled in the art will recognize that a system for activating and/or updating a mobile device to receive an alert message as described may apply to any environment, whether wired or wireless, and may be applied to any number of devices connected via a communications network and interacting across the network.

What is claimed:

1. A method comprising:
   receiving, during a registration sequence with a network, a network identifier from the network, the network identifier comprising at least one of an operator identification number or an alphanumeric representation that is indicative of the network and is indicative of a network provider associated with the network;
   accessing, during the registration sequence, information associated with an alert based on the network identifier, wherein the information comprises an identification of an alert message capable of being disabled, an identification of a channel capable of being disabled, an identification of an alert message incapable of being disabled, an identification of a channel incapable of being disabled, and an indication of a language of an alert message;
   configuring, during the registration sequence, the mobile device to receive the alert based on the accessed information; and
   comparing the received network identifier with an alert profile, wherein: the alert profile comprises alert information for one or more networks; and the information associated with the alert for the location of the network is accessed if, based on the comparison, the network identifier matches an identifier in the alert profile.

2. The method of claim 1, further comprising providing a registration request to the network.

3. The method of claim 2, wherein the network identifier is received from the network in response to the registration request.

4. A mobile device comprising:
   a communication component that provides communication between the mobile device and a network;
   a memory component for storing program code and a profile; and
   a processor in operative communication with the communication component and the memory component, wherein:
      the processor executes the program code; and
      the program code directs the mobile device to:
         receive, during a registration sequence with the network, via the communication component, a network identifier from the network, the network identifier comprising at least one of an operator identification number or an alphanumeric representation that is indicative of the network and is indicative of a network provider operating the network;
         determine, during the registration sequence, whether the network identifier is associated with alert information in the profile, the alert information comprising an identification of an alert message capable of being disabled, an identification of a channel capable of being disabled, an identification of an alert message incapable of being disabled, an identification of a channel incapable of being disabled, and an indication of a language of an alert message; and
         load during the registration sequence, the alert information if, based on the determination, the network identifier is associated with the alert information in the profile.

5. The mobile device in of claim 4, wherein the processor is further configured to determine whether the network identifier is associated with alert information in the profile by comparing the network identifier to one or more identifiers in the profile.

6. The mobile device of claim 5, wherein the alert information is loaded if, based on the comparison, the network identifier matches one of the one or more identifiers in the profile.

7. The mobile device of claim 5, wherein the processor is further configured to activate the mobile device to receive an alert message from the network based on the loaded alert information.

8. The mobile device in of claim 5, wherein the processor is further configured to receive an alert message, via the communication component, based on the loaded alert information.

9. The mobile device of claim 5, wherein the processor is further configured to receive, via the communication component, the alert information from the network; and store, via the memory component, the alert information in the profile.

10. The mobile device of claim 4, the processor is further configured to provide, via the communication component, a registration request to the network.

11. The mobile device of claim 10, wherein the processor is configured to receive the network identifier in response to the registration request.

12. A method comprising:
    receiving, during a registration sequence with a network, a registration request from a mobile device;
    determining, during the registration sequence, whether the mobile device has permission to access the network based on the received registration request;
    providing, during the registration sequence, a network identifier, the network identifier comprising at least one of an operator identification number or an alphanumeric representation that is indicative of the network and is indicative of a network provider associated with the network;
    comparing the network identifier with an alert profile, wherein: the alert profile comprises alert information for the network; and
    information associated with the alert is accessed if, based on the comparison, the network identifier matches an identifier in the alert profile; and
    providing, during the registration sequence and based on the comparing, the alert information to the mobile device if, based on the determination, the mobile device has permission to access the network, the alert information comprising an identification of an alert message capable of being disabled, an identification of a channel capable of being disabled, an identification of an alert message incapable of being disabled, an identification of a channel incapable of being disabled, and an indication of a language of an alert message.

13. The method of claim 12, wherein determining whether the mobile device has permission to access the network based on the received registration request comprises determining whether an agreement exists between the network and a home network of the mobile device.

14. The method of claim 13, wherein providing alert information to the mobile device if, based on the determination, the mobile device has permission to access the network comprises providing emergency alert information to the mobile device if, based on the determination, the agreement exists between the network and the home network of the mobile device.

15. A mobile device comprising:
a communication component for providing communication between the mobile device and a network;
a memory component for storing program code;
a processor in operative communication with the communication component and the memory component, wherein:
the processor executes the program code and
the program code directs the mobile device to:
receive, during a registration sequence with a network, via the communication component, a network identifier, the network identifier comprising at least one of an operator identification number or an alphanumeric representation that is indicative of the network and is indicative of a network provider associated with the network;
compare the network identifier with an alert profile, wherein:
the alert profile comprises alert information for the network; and
information associated with the alert is accessed if, based on the comparison, the network identifier matches an identifier in the alert profile; and
receive, during the registration sequence and based on the comparison, the alert information associated with an alert message capable of being broadcast from the network, the alert information comprises an identification of an alert message capable of being disabled, an identification of a channel capable of being disabled, an identification of an alert message incapable of being disabled, an identification of a channel incapable of being disabled, and an indication of a language of an alert message; and
configure, during a registration sequence, the mobile device to operate in accordance with the received alert information.

16. The mobile device of claim 15, wherein the program code further directs the mobile device to:
create the profile; and
store, via the memory component, the created profile.

* * * * *